United States Patent [19]

Wilkins et al.

[11] Patent Number: 4,822,486

[45] Date of Patent: Apr. 18, 1989

[54] ROTARY SELF-CLEANING STRAINER

[75] Inventors: Thomas R. Wilkins; Charles A. Wilkins; James O. Stoneburner, all of Ann Arbor, Mich.

[73] Assignee: Perfection Sprinkler Co., Ann Arbor, Mich.

[21] Appl. No.: 117,064

[22] Filed: Oct. 23, 1987

[51] Int. Cl.$^4$ .............................................. B01D 33/06
[52] U.S. Cl. .................................... 210/170; 210/393; 210/394; 210/412; 210/416.1; 210/460; 210/499
[58] Field of Search ............... 210/167, 170, 354, 357, 210/359, 393, 394, 409, 411, 412, 416.1, 416.2, 437, 457, 459, 460, 461, 463, 499

[56] References Cited

U.S. PATENT DOCUMENTS

| | | | |
|---|---|---|---|
| 2,857,053 | 10/1958 | Schmiedel | 210/394 |
| 3,275,150 | 9/1966 | Tait | 210/394 |
| 3,882,025 | 5/1975 | Talley, Jr. | 210/354 |
| 4,599,172 | 7/1986 | Gardes | 210/409 |
| 4,610,786 | 9/1986 | Pearson | 210/412 |

Primary Examiner—Richard V. Fisher
Assistant Examiner—Wanda L. Millard
Attorney, Agent, or Firm—Rhodes and Boller

[57] ABSTRACT

A rotary self-cleaning strainer comprises a circular cylindrical walled PVC pipe on which a circular cylindrical filter screen assembly is journaled for rotation. The PVC pipe has an intake that is surrounded by the filter screen assembly and a discharge that is connected to a pump. When the strainer is placed in a body of water that is to be pumped, water is drawn through the screen that forms the sidewall of the filter screen assembly and enters the intake of the PVC pipe. The filtered water is conducted through the PVC pipe and to the pump. A nozzle structure disposed within the filter screen assembly is supplied with water from a separate supply line connected to the strainer. The water is forcefully emitted against the screen to both rotate the screen assembly and dislodge adhering debris from the exterior of the screen. The strainer also has a lip type seal and a series of wheels which seal and journal one axial end of the filter screen assembly to and on the PVC pipe. The other axial end is journaled and sealed by a series of circular annular discs around a bushing on a pipe that passes coaxially through the PVC pipe and into which the nozzle structure is tapped. The intake is a series of holes of progressively increasing size in the direction away from the discharge.

20 Claims, 5 Drawing Sheets

ROTARY SELF-CLEANING STRAINER

BACKGROUND AND SUMMARY OF THE INVENTION

When water is to be pumped out of an outdoor pit or reservoir, it is important to prevent debris, such as leaves, sticks, discarded plastic and paper articles, stones, etc., from entering the pump. Rotary self-cleaning strainers that contain cylindrical screens for performing the straining function are often used for this purpose.

The strainer is attached to the end of a conduit and immersed in the body of water that is to be pumped. The pump is operated to suck water through the strainer and conduit, as the strainer screen prevents debris from being sucked into the conduit along with the water. Certain debris may adhere to the screen's exterior due to the pump suction force. However, the continued adherence of such debris to the screen's exterior, and resulting impairment of flow through the screen, is prevented by rotating the screen past a nozzle structure which is disposed on the interior of the screen and directs water outwardly through the screen to dislodge the debris. The water is fed under pressure to the strainer through a separate supply line which may be tapped into the pump's outlet. The water acts on only a limited circumferential zone of the screen at any given time to force adhering debris away from the exterior of the screen as the screen revolves past the nozzle structure. The remainder of the screen serves to conduct the flow of liquid that is being pumped out of the pit or reservoir through the screen and into the conduit.

The present invention relates to improvements in rotary self-cleaning strainers of this general type. The rotary self-cleaning strainer of this invention possesses a number of novel and unique features which individually and collectively contribute to the improvements. These features are disclosed in the preferred embodiment of the invention which will be illustrated and described herein. This embodiment of the invention comprises materials that are strong, lightweight and have a long working life. The organization and arrangement of the various component parts and the extensive use of such strong and lightweight materials contributes to a rugged and durable rotary self-cleaning strainer that possesses superior attributes over prior strainers of the same general type.

One feature of the disclosed preferred embodiment relates to the manner in which the screen is arranged for rotation, and this feature is characterized by novel means for journaling and sealing the rotary portion of the strainer to the non-rotary position.

A further aspect of the invention relates to a novel configuration in the non-rotary portion of the strainer that promotes a more substantially uniform flow velocity through the rotary screen over the zone of the screen that is not exposed to the self-cleaning action. In certain other rotary self-cleaning strainers already in use, there is a significant disparity in flow velocity through the screen at different locations on the screen. This gives rise to "hot spots" and hinders the overall effectiveness of the pumping action.

A still further feature of the invention relates to the manner in which the nozzle structure that performs the self-cleaning function is organized and arranged in assembly with other component parts and to impart rotation to the screen.

The foregoing features, advantages and benefits of the invention, along with additional ones, will be seen in the ensuing description and claims which should be considered in conjunction with the accompanying drawings. The drawings disclose a preferred embodiment of the invention in an exemplary usage according to the best mode contemplated at the present time in carrying out the invention.

DESCRIPTION OF THE PREFERRED EMBODIMENT

Figure 1:
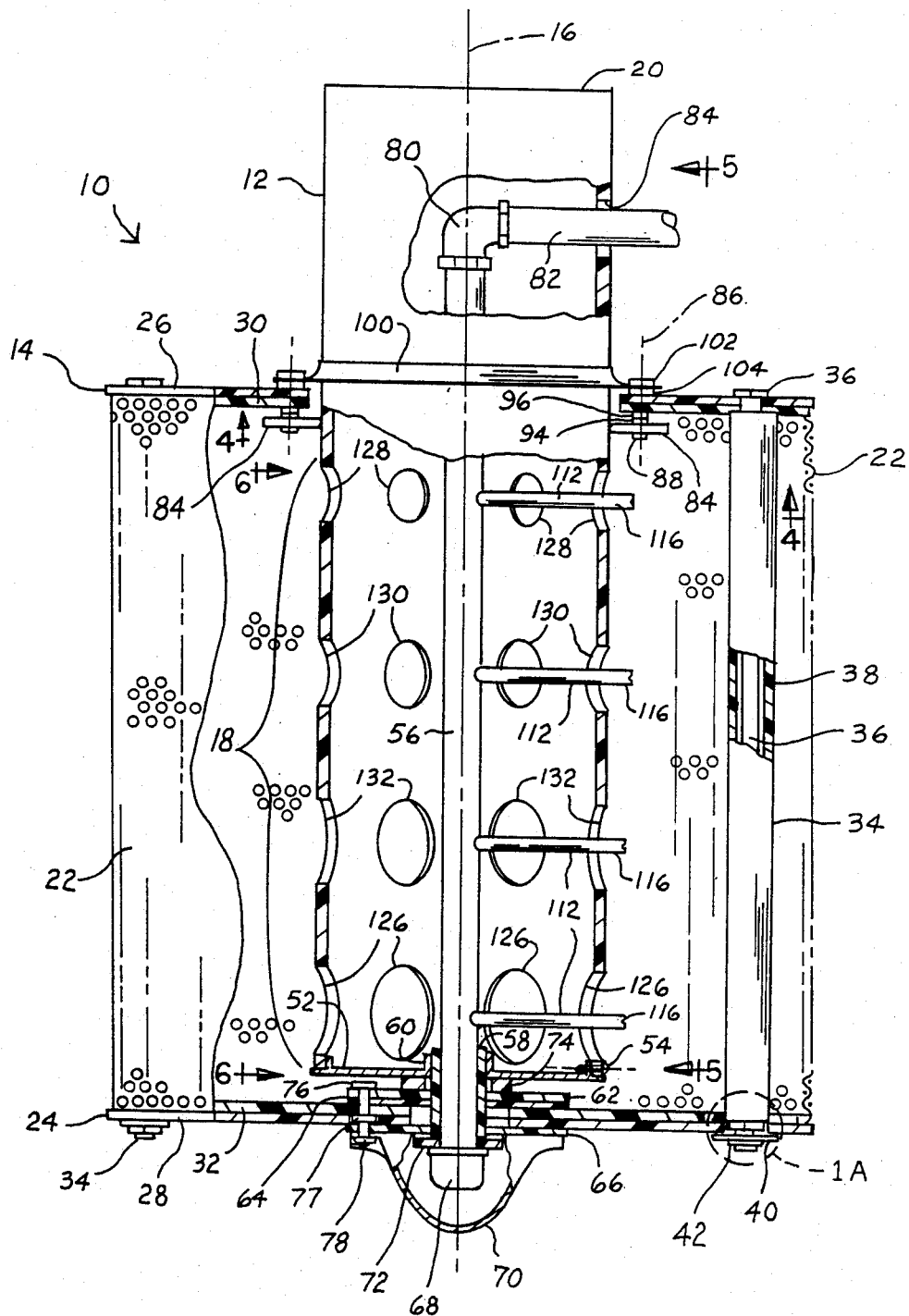
FIG. 1 is a longitudinal cross sectional view, having portions broken away, through a presently preferred embodiment of rotary self-cleaning strainer according to this invention.
Figure 2:
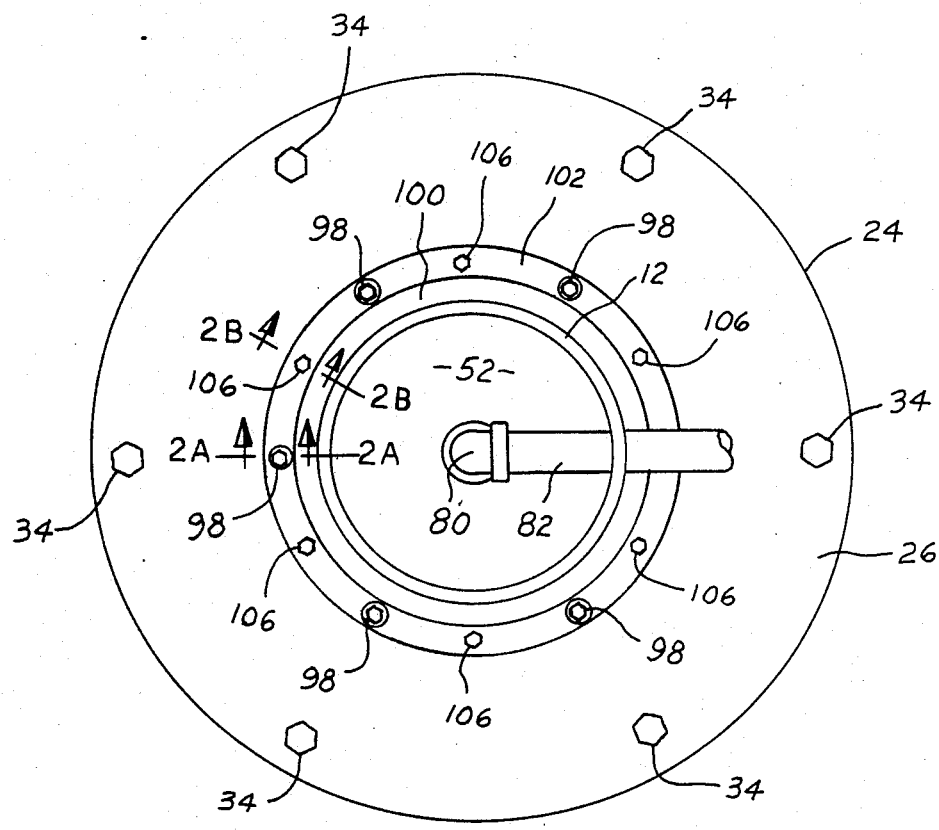
FIG. 2 is a full top plan view of the strainer of FIG. 1.
Figure 1A:
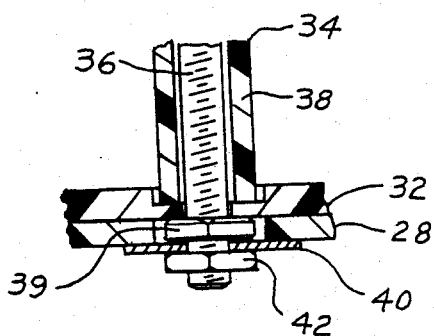
FIG. 1A is an enlarged sectional view in circle 1A of FIG. 1.
Figure 2A:
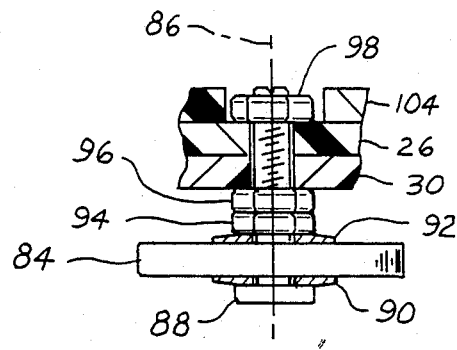
FIGS. 2A and 2B are enlarged fragmentary sectional views in the direction of arrows 2A—2A and 2B—2B respectively in FIG. 2.
Figure 3:
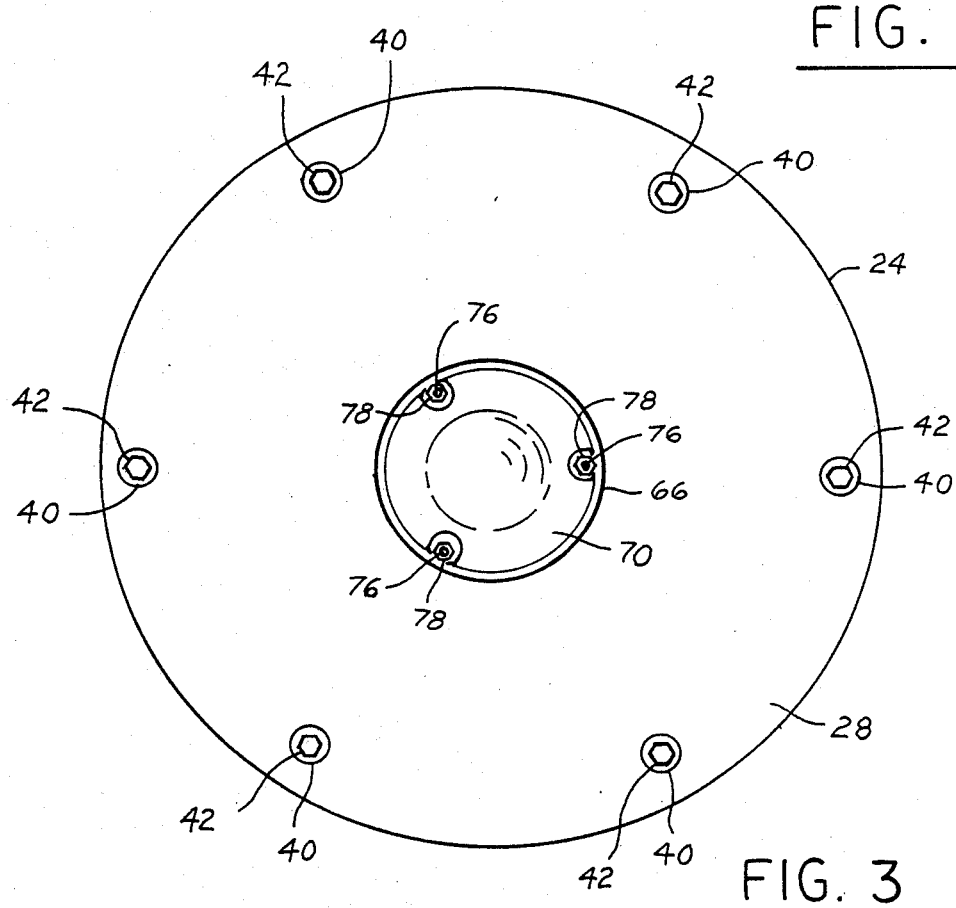
FIG. 3 is full bottom plan view of the strainer of FIG. 1.
Figure 2B:
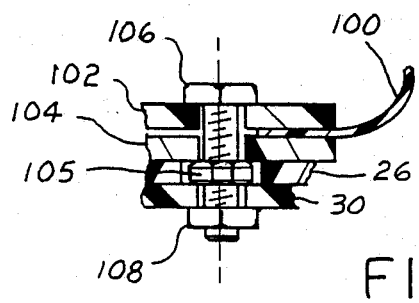
Figure 4:
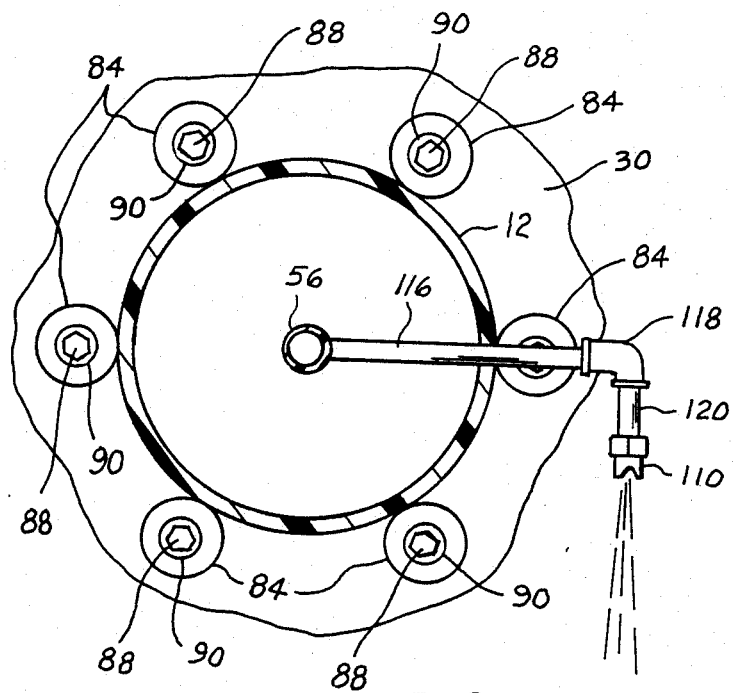
FIG. 4 is a fragmentary transverse cross sectional view taken generally in the direction of arrows 4—4 in FIG. 1.

The drawing figures show a rotary self-cleaning strainer 10 that comprises a circular cylindrical walled pipe 12 and a circular cylindrical filter screen assembly 14. Pipe 12 and filter screen assembly 14 are coaxial about an axis 16 with filter screen assembly 14 being journaled for rotation on pipe 12 about axis 16.

Figure 6:
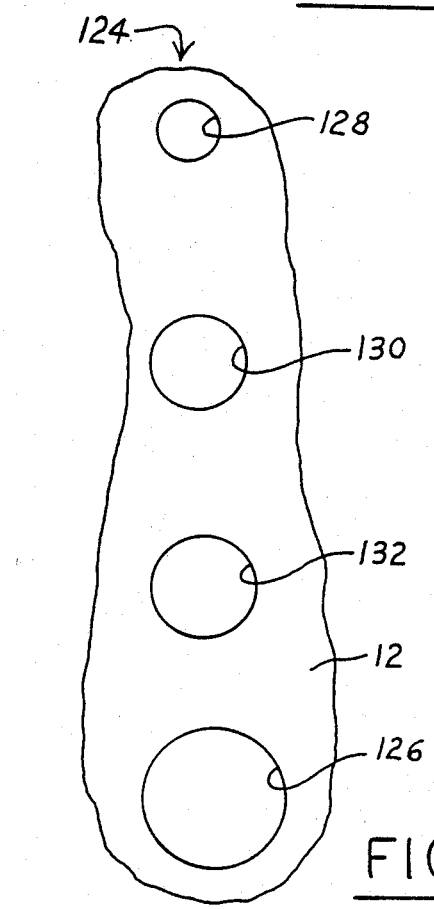
FIG. 6 is a fragmentary view taken generally in the direction of arrows 6—6 in FIG. 1.

Pipe 12 has an intake portion, 18 generally, and a discharge portion 20. The latter portion is adapted to be operatively connected to a pump such that when the pump is operated, the pump suction force is conducted through the interior of pipe 12 to intake portion 18. An exemplary use will be described later in more detail in connection with FIG. 7. Intake portion 18 comprises a number of circular holes through the pipe sidewall arranged in a particular manner to be hereinafter described in greater detail in connection with FIG. 6.

Filter screen assembly 14 is arranged to enclose intake portion 18, and comprises a circular cylindrical screen 22 which is disposed in outwardly spaced relation to, but coaxial with, pipe 12. The specific details of screen 22, such as screen thickness and the size and density of holes through the screen, will depend upon the particular size of strainer 10 and the particular intended use for which the strainer is designed. An example of a preferred material for screen 22 is standard perforated aluminum sheet.

Screen 22 is supported on a spool-like frame, 24 generally, that comprises two circular discs 26, 28 at opposite axial ends. The outside diameter of each disc 26, 28 is slightly larger than the outside diameter of screen 22.

Two smaller circular discs 30, 32 are disposed against the axially interior faces of discs 26, 28, respectively, and are of a diameter slightly less than the inside diameter of screen 22. As such, the two pairs of discs, 26, 30 being one pair and 28, 32 the other pair, form respective circular shoulders for seating the respective axial ends of screen 22, and the disc pairs serve to close the open axial ends of the screen. By making the screen of a sufficiently strong material there need be no means for actually attaching the screen to the frame. In other words, the illustrated construction is sufficient to entrap the screen on frame 24 in substantially coaxial relationship to pipe 12.

A series of identical tie rod structures 34 serve to hold the two discs in spaced apart parallel relationship perpendicular to axis 16. Each tie rod structure 34 comprises a headed fastener 36 that is disposed parallel to axis 16 and whose shank passes through aligned holes in discs 26 and 28, and countersunk holes in discs 30 and 32. A cylindrical compression tube 38 has its ends seated in the countersunk portions of these holes in discs 30 and 32, and the shank of the fastener 36 passes through this tube. The distal end of fastener 36 is threaded. A first nut 39 is threaded onto the distal end of fastener 36 and tightened against disc 32 thereby causing a compression force to be developed on tube 38 with the result that the disc pair 26, 30 and disc 32 are securely joined in assembly via the tie rod structure 34. The hole in disc 28 provides a cavity for nut 39 when disc 28 is disposed against disc 32. With disc 28 so disposed, a washer 40 and a second nut 42 are assembled onto the distal end of fastener 36, and nut 42 is tightened on the fastener, thereby forcing disc 28 against disc 32 to provide a secure, but readily separable, joining of the two discs 28, 32 in assembled relationship. The illustrated embodiment of strainer comprises six tie rod structures 34, spaced at 60° on a common circle around filter screen assembly 14 about axis 16. This arrangement provides for a convenient installation and removal of disc 28 by simply fastening and unfastening nuts 42, and as will become more apparent from further description later on, with disc 28 removed, screen 22 can be slid axially onto and off of the frame. This facilitates screen maintenance and/or replacement, if needed; it also provides for ready access to the interior of the frame, and to components disposed therein.

The end closures formed by the respective disc pairs 26, 30 and 28, 32 contain respective structures for journaling and sealing filter screen assembly 14 on and with respect to pipe 12. The journaling and sealing of the lower end (as viewed in FIG. 1) of the filter screen assembly on pipe 12 is provided by the following structure. A circular annular end cap 52 is fitted and attached to the lower end of pipe 12. There are three points of attachment by fastener means 54 spaced 120° apart around pipe 12. A length of a circular, cylindrical pipe 56 of considerably smaller diameter than pipe 12 passes coaxially through end cap 52. As will become more apparent from a later detailed description, this pipe 56 serves to supply water to the nozzle structure that cleans and rotates the screen assembly. A circular, cylindrical bushing 58 is disposed between pipe 56 and end cap 52, and a set screw 60 through the end cap is used to hold the bushing in place.

Bushing 58 has a length which extends beyond end cap 52 and through central circular clearance holes in the pair of discs 28, 32. Disposed against opposite axial faces of the disc pair 28, 32 are circular annular discs 62, 64, 66 forming a bearing within which bushing 58 has a close rotatable fit. The end of pipe 56 projects beyond this bearing and is closed by a pipe cap 68 threaded onto the pipe's end. This pipe cap is in turn enclosed by a dome-shaped cover 70. There are also two annular spacers 72, 74 disposed as shown.

Bearings 62, 64, 66 and cover 70 are secured in assembly on disc pair 28, 32 at three locations 120° apart. At each location the shank of a headed fastener 76 is passed through aligned holes in bearing discs 62, 64, discs 32, 28, bearing disc 66, and the outer margin of cover 70 that is disposed against the outer margin of bearing disc 66. The two bearings 62, 64 that are on the interior of assembly 14 are secured to disc 32 by threading nuts 77 onto the threaded distal end of each fastener 76 and tightening against disc 32. The aligned holes in disc 28 form cavities for the nuts 77. Cover 70 is separably secured by a further nut 78 that is threaded onto the threaded distal end of each fastener 76 and tightened to secure the cover and disc 66 in assembled relationship against disc 28 and in satisfactorily sealed manner to prevent intrusion of debris through the journal structure thus formed at this end of the strainer.

An elbow 80 is attached to the end of pipe 56 opposite cap 68. A further section of pipe 82 extends from elbow 80 radially through a suitable opening 84 in the sidewall of pipe 12, and it is through this radial pipe section 82 that water enters pipe section 56.

Journaling of filter screen assembly 14 on pipe 12 adjacent the location where pipe section 82 passes through the sidewall of pipe 12 is accomplished by a series of spaced apart circular wheels 84 disposed on the pair of discs 26, 30. The illustrated embodiment comprises six such wheels 84 at 60° intervals on a common circle about axis 16. Each wheel is supported on the disc pair 26, 30 for rotation about an axis 86 that is parallel to axis 16 and set radially outwardly from the wall of pipe 12 in an amount substantially equal to the wheel's radius. In this way, each wheel essentially tangentially engages the outer wall of pipe 12.

The two discs 26, 30 have central circular clearance holes through which pipe 12 passes. The diameter of each of these holes is sufficiently greater than the O.D. of pipe 12 but sufficiently less than the radial distance of each axis 86 from axis 16 to provide adequate support for the wheels. The wheels are disposed on the interior of assembly 14 where they will be protected from debris.

In order to prevent intrusion of debris into the interior of assembly 14 through the annular gap that exists between pipe 12 and the disc pair 26, 30, an annular seal 100 is provided. This seal is a thin lip type seal element whose outer margin is held between a pair of retaining rings 102, 104 and whose inner margin is disposed in full sealing contact around the outside of pipe 12. The outer margin of the seal held by rings 102, 104, is generally transverse to axis 16 while the inner margin of the seal curves to terminate with a lip type surface contact around the full perimeter of tube 12. As filter screen assembly 14 rotates on pipe 12, the seal maintains full continuous contact with the wall of pipe 12 so that debris cannot intrude into the interior of the assembly through the gap between the end discs 26, 30 and pipe 12. By curving the lip outwardly away from the interior of assembly 14, attempted intrusion will only serve to urge the lip more forcefully against the pipe.

Rings 102, 104 have matching hole patterns in registry with a corresponding hole pattern through the disc pairs 26, 30. In the illustrated embodiment, there are twelve holes in the pattern uniformly spaced at 30° intervals on a common circle about axis 16. Alternate ones of these holes are used both to fasten the two rings 102, 104 which sandwich the outer margin of seal element 100 to form an assembly of 100, 102, 104, and also to fasten the assembly thus formed to disc 30. For this purpose, the shanks of headed fasteners 106 are passed through these holes in ring 102 and ring 104. A first nut 105 is threaded onto the distal end of the fastener shank and tightened to secure the parts 100, 102, 104 in assembly. Disc 26 contains a cavity for each nut 105 while the shank further projects through a hole in disc 30. A second nut 108 is threaded onto the shank end and tightened against disc 30 to secure the assembled parts 100, 102, 104 on disc 30.

The remaining six holes of the twelve hole pattern register with the axes 86 of wheels 84. The parts which are used for mounting of each wheel on the disc pair 26, 30 comprise a headed fastener 88 that has a threaded shank, a pair of washers 90, 92 and three nuts 94, 96, 98 assembled as illustrated. The nuts 96, 98 are tightened against opposite sides of the disc pair 30, 26. Nut 94 is tightened against nut 96. The two washers 90, 92 are spaced on opposite sides of the wheel, and the wheel has a slightly larger I.D. than the diameter of the shank of fastener 88. Nuts 94, 96 serve to space each wheel axially away from disc 30. Ring 104 contains a cavity for nut 98 that allows ring 104 to be disposed flat against disc 26 when the assembly consisting of parts 100, 102, 104 is attached to the end closure. The wheel freely rotates on the fastener shank without excessive radial or axial play.

Figure 5:
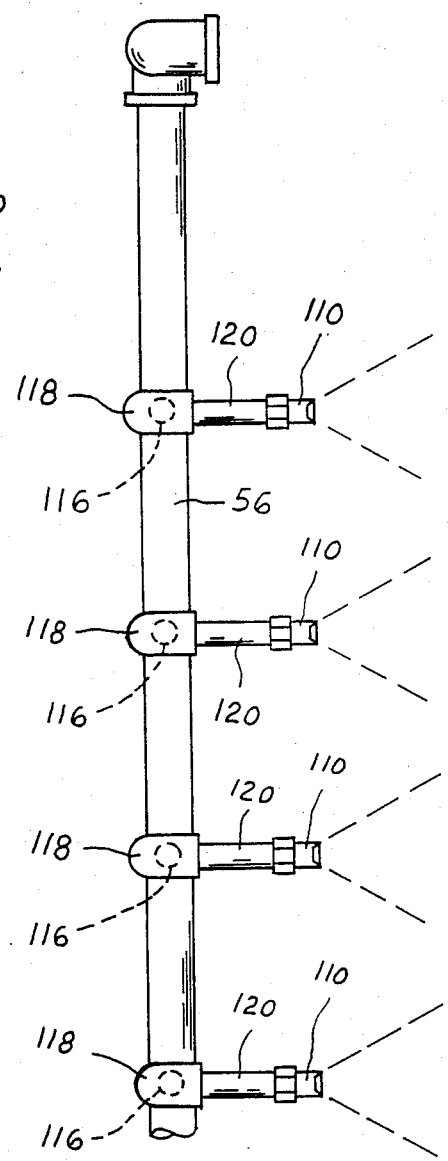
FIG. 5 is a fragmentary cross sectional view taken generally in the direction of arrows 5—5 in FIG. 1.

Rotation and cleaning of the screen assembly is produced by means of a series of nozzles 110, four in number in the illustrated embodiment, which are spaced apart along the length of the screen. Each nozzle is at one end of a pipe structure 112 whose other end taps into pipe 56. These pipe structures pass through spaced apart, but circumferentially aligned, circular holes in the wall of pipe 12. The nozzles are aimed to impart both tangential and radially outward components of force to the screen over a particular limited circumferential zone relative to pipe 12. Advantageously, the nozzles are of the type that in air direct a flat, wide and uniform spray pattern such as schematically portrayed in FIG. 5. This is sufficient to cover substantially the full length of the screen along this limited circumferential zone even with the nozzles immersed in water, as they are when the strainer is in use. As such, simultaneous rotating and cleaning action is imparted to the screen by the nozzles. An example of a preferred nozzle is Model H 1/4 DN-SS8070, Spraying Systems Co., Wheaton, Ill. Because the action of the nozzles occurs over a limited circumferential extent of the screen at any given time, the pump suction force delivered through pipe 12 to intake 18 draws liquid through the remainder of the screen.

Each pipe structure 112 comprises a radial pipe 116 having one end which is threaded into a tapped hole in the sidewall of pipe 56. Each pipe 116 passes through a corresponding clearance hole in the wall of pipe 12, and an elbow 118 is attached to the opposite end of the pipe. A shorter pipe 120 projects from the elbow so as to be disposed at 90° to the radial pipe 116. A nozzle 110 is at the end of this shorter pipe 120. For a sufficiently great water pressure, screen 22 is impacted with a sufficient force to both dislodge adhering debris from the outside of the screen and also rotate assembly 14 about pipe 12. A recommended water pressure of 60 psi is more than adequate to both clean and rotate the screen in typical pumping applications.

One of the features of the invention, previously alluded to, is the intake portion 18. This intake portion is configured to promote a more uniform velocity of flow through the screen from exterior to interior, thereby minimizing the tendency toward creation of undesirable "hot spots". With the discharge portion 20 of pipe 12 being connected to the suction side of the pump, the suction force along the length of pipe 12 will progressively decrease along pipe 12 in the direction away from discharge portion 20. In order to promote a more uniform velocity of flow through screen 22 along its length, the intake openings of portion 18 are made progressively larger in size in the direction away from discharge portion 20.

In the illustrated embodiment, the intake portion comprises a series of circular holes through the sidewall of pipe 12. There are six axial rows 124 of holes, one of which is shown by itself in FIG. 6. Each row 124 contains four holes whose centers are approximately uniformly spaced apart along the length of pipe 12. The rows 124 are arranged 60° apart from each other around the pipe, and the four radial pipes 112 pass through the four holes of one of the six rows. With this arrangement, the six largest holes 126 are farthest away from the suction source while the six smallest holes are closest to the suction source. The holes 130 and 132 lie between holes 126 and 128. By making the holes smaller the closer they are to discharge portion 20, the net result is to more substantially equalize the flow volume entering pipe 12 at the different locations along the pipe's length. Correspondingly, a more uniform flow through the filter screen is created, thereby minimizing the tendency of forming of "hot spots" in the screen.

The illustrated construction makes liberal use of polymeric materials and their attendant advantages of durability, non-corrosion, and light weight. The discs 26, 28, 30, 32 are high density polyethylene. Advantageously, the larger discs 26, 30 are black in color to avoid ultra violet degradation. Pipe 12 Is polyvinylchloride (PVC) pipe. The bushing 58, bearings 62, 64, 66, spacers 72, 74 and wheels 84 are ultra high molecular weight (UHMW) plastic. Seal 100 is polytetrafluoroethylene (Teflon) to provide a slippery sealing action. Advantageously, the seal can be formed by cutting a ring out of thin sheet material. In its free condition, the diameter across the inside of the ring is made less than the O.D. of pipe 12 so that when the seal is assembled onto the pipe, it is uniformly flexed by the pipe to the illustrated curved lip shape so that full sealing contact with the pipe is assured.

The various pipes and fittings associated with the nozzles are also polymeric. The preferred nozzles, however, are machined parts which develop a flat, wide, hard hitting and uniform spray pattern. The metal parts, such as the nozzles and fasteners, are preferably stainless steel.

Figure 7:
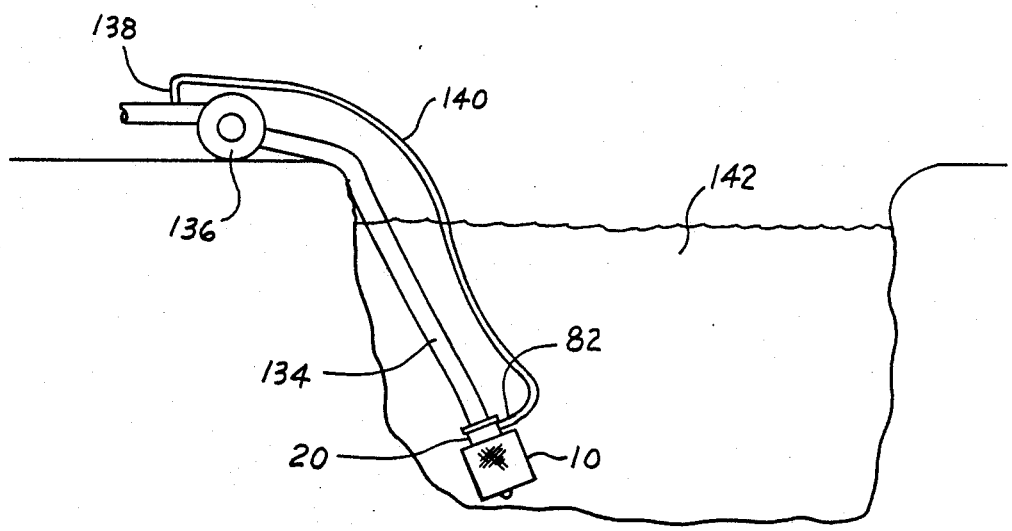
FIG. 7 is a schematic diagram illustrating exemplary usage of the strainer of FIG. 1 in pumping water from a reservoir.

FIG. 7 illustrates schematically use of the rotary filter screen. The discharge portion 20 of pipe 12 is attached to a conduit 134 which in turn connects to the suction side of a pump 136. A tap 138 into the discharge side of the pump connects through a supply line 140 back to connect to pipe 82. FIG. 7 shows filter screen assembly 10 immersed in a pit of water 142 which is to be pumped. When pump 136 is operated, suction force is transmitted through conduit 134 to the filter screen assembly. Water is sucked through the filter screen assembly, passing through pipe 12 and conduit 134 to pump 136. Pressurized water is returned through supply line 140, passes through pipe structures 112 and is emitted at nozzles 110. The nozzles impart rotation to the filter screen assembly while dislodging any debris which may adhere to the outside of the screen as the screen revolves past the nozzles. The strainer 10 should be disposed in a suitable location in the body of water where interference with its rotation will not occur.

The illustrated embodiment which has been described is representative of principles of the invention in an exemplary use. Principles of the invention may be practiced in other equivalent embodiments and equivalent uses where a debris containing liquid is to be pumped. The particular size of any given embodiment of the invention will depend upon the application to which it is to be put.

The illustrated embodiment is approximately proportioned for a screen which has a 22 inch axial dimension and a diameter of approximately 20 inches. For a 60 PSI supply source, about 32 gallons per minute of water are discharged through the four nozzles. Pipe 12 is approximately 8 inch diameter and for typical pump suction pressures, strainer 10 will have a capacity of 1150 gallons per minute. The hole pattern constituting the openings of intake 18 comprises a 3 inch, a 2.5 inch, a 2 inch, and a 1.75 inch diameter hole for the respective holes 126, 132, 130, 128. The area of each of these holes is approximately 7.06, 4.90, 3.14, and 2.37 square inches, respectively. Thus, the six holes 126 have a total area of approximately 42.36 square inches; the six holes 132, a total area of 29.40 square inches; the six holes 130, a total area of 18.84 square inches; and the holes 128, a total area of 14.22 square inches. The total area of holes 126 is approximately 84% of the cross sectional flow area through pipe 12 while the percentages for the remaining three sets of holes 132, 130 and 128 are 58%, 37%, and 28%.

It is to be appreciated that these specific dimensions are given as an example for one particular strainer size. Standard design and engineering calculational techniques can be used to implement principles of the invention in other shapes and sizes.

The use of standard PVC tubing for pipe 12 is an advantage because there are many standard connectors which are adapted for fitting onto the end of such a pipe to make connection to various types of suction conduit. The holes for the intake apertures can be conveniently created by conventional fabrication techniques.

The component parts can be conveniently assembled together. The concluding steps in the assembly procedure comprise the attachment of disc 28 and cover 70. Consequently, when it is desired to remove screen 22 for repair, maintenance, and/or to provide access to the interior of assembly 14 for any reason, nuts 78 are removed from fasteners 76 allowing cover 70 to be removed. Pipe cap 68 is unthreaded from the end of pipe 56 allowing spacer 72 and bearing disc 66 to be removed. Nuts 42 are unfastened from fasteners 36 and after washers 40 have been removed, disc 28 can be separated. This allows screen 22 to now be slid axially off the assembly over disc 32 which remains attached to the other disc pair 26, 30 by virtue of the tie rods 34. After any maintenance, repair, or replacement has been performed, the strainer is reassembled in the opposite fashion.

Although the strainer of the invention admirably accomplishes the objective of attaining a more uniform flow through the screen, actual usage has shown that peak suction pressures may be exerted on the screen in alignment with the openings of intake 18 in pipe 12. These regions may be exposed to moderately higher suction forces than other areas of the screen. However, any tendency toward adherence of debris to these regions where the suction pressure may be moderately higher is compensated by having the nozzles disposed axially at the same axial level as the intake openings.

Thus, while a preferred embodiment of the invention has been illustrated and described, it will be appreciated that principles are applicable to other embodiments.

What is claimed is:

1. A self-cleaning strainer for connection to a pump and immersion in debris-containing liquid to prevent debris in the liquid from being sucked along with the liquid into the pump, said strainer comprising a main cylindrical pipe having an intake and a discharge at spaced locations along its length, said discharge serving to communicate the pipe to the pump and said intake serving to communicate the pipe to the liquid, a cylindrical screen for straining the debris from the liquid, means for supporting and journaling said screen on and for coaxial rotation about said main pipe in a manner that disposes said screen in outwardly spaced relation to said main pipe and in surrounding relation to said intake for causing liquid entering the intake to have been strained by said screen, a supply pipe extending coaxially through said main pipe to protrude beyond an end thereof, one or more apertures through the sidewall of said main pipe, one or more pipe structures tapped into said supply pipe, extending through said one or more apertures and terminating in nozzles directed toward said screen for both cleaning and rotating the screen by fluid that is fed through said supply pipe and said pipe structures and emitted at said nozzles, and said means for supporting and journaling said screen on and for coaxial rotation about said main pipe comprises a journal structure that acts on said main pipe between the intake and discharge thereof and a further journal structure that acts on said supply pipe where said supply pipe protudes beyond an end of said main pipe.

2. A self-cleaning strainer for connection to a pump and immersion in debris-containing liquid to prevent debris in the liquid from being sucked along with the liquid into the pump, said strainer comprising a main cylindrical pipe having an intake and a discharge at spaced locations along its length, said discharge serving to communicate the pipe to the pump and said intake serving to communicate the pipe to the liquid, a cylindrical screen for straining the debris from the liquid, means for supporting and journaling said screen on and for coaxial rotation about said main pipe in a manner that disposes said screen in outwardly spaced relation to said pipe and in surrounding relation to said intake for causing liquid entering the intake to have been strained by said screen, a supply pipe extending axially through said main pipe, one or more apertures through the sidewall of said main pipe, one or more pipe structures tapped into said supply pipe, extending through said one or more apertures and terminating in nozzles directed toward said screen for both cleaning and rotating the screen by fluid that is fed through said supply pipe and said pipe structures and emitted at said nozzles, in which said intake comprises openings through the sidewall of said main pipe, said openings being spaced apart axially along said main pipe and said openings being progressively larger in size the further they are along the length of said main pipe from said discharge.

3. A self-cleaning strainer as set forth in claim 2 in which said openings comprise a pattern of circular holes arranged in axial rows that are circumferentially spaced around said main pipe.

4. A self-cleaning strainer as set forth in claim 3 in which said one or more apertures comprise plural apertures arranged in an axial row which is parallel to the axial rows of holes.

5. A self-cleaning strainer as set forth in claim 4 in which said supply pipe is substantially coaxial with said main pipe, said pipe structures comprise radial pipe portions connected to and extending radially of said supply pipe, said radial portions extend through said apertures, and said pipe structures comprise further portions arranged transversely to said radial portions and containing said nozzles directed toward said screen at a circumferential location that is spaced circumferentially from the location at which the radial pipe sections pass through the main pipe.

6. A self-cleaning strainer for connection to a pump and immersion in debris-containing liquid to prevent debris in the liquid from being sucked along with liquid into the pump, said strainer comprising a main cylindrical pipe having an intake and a discharge at spaced locations along its length, said discharge serving to communicate the pipe to the pump and said intake serving to communicate the pipe to the liquid, a cylindrical screen for straining the debris from the liquid, means for supporting and journaling said screen on and for coaxial rotation about said main pipe in a manner that disposes said screen in outwardly spaced relation to said pipe and in surrounding relation to said intake for causing liquid entering the intake to have been strained by said screen, a supply pipe extending axially through said main pipe, one or more apertures through the sidewall of said main pipe, one or more pipe structures tapped into said supply pipe, extending through said one or more apertures and terminating in nozzles directed toward said screen for both cleaning and rotating the screen by fluid that is fed through said supply pipe and said pipe structures and emitted at said nozzles, in which said means for supporting and journaling said screen on and for coaxial rotation about said main pipe comprises a spool-like structure having end wall structures which close the axial ends of said screen to said main pipe and a series of circular wheels supported on one of said end wall structures in outwardly spaced relation to said main pipe and arranged so that each wheel has essentially a tangential circumferential contact between its perimeter and the outside wall of said main pipe.

7. A self-cleaning strainer as set forth in claim 6 in which said wheels are substantially identical and arranged for rotation about individual axes parallel to the axis of said main pipe and lying on a common circle coaxial with said main pipe.

8. A self-cleaning strainer as set forth in claim 7 including an annular lip type seal supported on said one end wall structure to provide a full circumferentially continuous sealing lip contact with the outside wall of said main pipe for sealing between said main pipe and said one end wall structure.

9. A self-cleaning strainer as set forth in claim 8 in which the outer margin of said seal is held by ring retention structure on said one end wall structure.

10. A self-cleaning strainer as set forth in claim 9 in which said wheels are disposed interiorly of the screen relative to said annular seal.

11. A self-cleaning strainer for connection to a pump and immersion in debris-containing liquid to prevent debris in the liquid from being sucked along with the liquid into the pump, said strainer comprising a main cylindrical pipe having an intake and a discharge at spaced locations along its length, said discharge serving to communicate the pipe to the pump and said intake serving to communicate the pipe to the liquid, a cylindrical screen for straining the debris from the liquid, means for supporting and journaling said screen on and for coaxial rotation about said main pipe in a manner that disposes said screen in outwardly spaced relation to said pipe and in surrounding relation to said intake for causing liquid entering the intake to have been strained by said screen, a supply pipe extending axially through said main pipe, one or more apertures through the sidewall of said main pipe, one or more pipe structures tapped into said supply pipe, extending through said one or more apertures and terminating in nozzles directed toward said screen for both cleaning and rotating the screen by fluid that is fed through said supply pipe and said pipe structures and emitted at said nozzles, in which said means for supporting and journaling said screen on and for coaxial rotation about said main pipe comprises a circular cylindrical bushing fitted onto said supply pipe, said supply pipe being arranged coaxial with said main pipe and passing through an end wall structure that closes one end of said screen, and a series of annular discs supported on said end wall structure and containing circular holes with respect to which the outside of said bushing has close rotatable fit.

12. A self-cleaning strainer for connection to a pump and immersion in debris-containing liquid to prevent debris in the liquid from being sucked along with liquid into the pump, said strainer comprising a main cylindrical pipe having an intake and a dischage at spaced locations along its length, said discharge serving to communicate the pipe to the pump and said intake serving to communicate the pipe to the liquid, a cylindrical screen for straining the debris from the liquid, means for supporting and journaling said screen on and for coaxially rotation about said main pipe in a manner that disposes said screen in outwardly spaced relation to said pipe and in surrounding relation to said intake for causing liquid entering the intake to have been strained by said screen, a supply pipe extending axially through said main pipe, one or more apertures through the sidewall of said main pipe, one or more pipe structures tapped into said supply pipe, extending through said one or more apertures and terminating in nozzles directed toward said screen for both cleaning and rotating the screen by fluid that is fed through said supply pipe and said pipe structures and emitted at said nozzles, in which said means for supporting and journaling said screen on and for coaxial rotation about said main pipe comprises a spool-like structure having end wall structures which close the axial ends of said screen to said main pipe and on which said spool-like structure is journaled, a series of circular wheels supported on one of said end wall structures in outwardly spaced relation to said main pipe and arranged so that each wheel has essentially a tangential circumferential contact between its perimeter and the outside wall of said main pipe, said supply pipe being arranged coaxial with said main pipe and passing through the outer end wall structure, a circular cylindrical bushing fitted onto said supply pipe where it passes through said other end wall structure, and a series of annular discs supported on said other end wall structure and containing circular holes with respect to which the outside of said bushing has a close rotatable fit.

13. A self-cleaning strainer for connection to a pump and immersion in debris-containing liquid to prevent debris in the liquid from being sucked along with liquid into the pump, said strainer comprising a main cylindrical pipe having an intake and a discharge at spaced locations along its length said discharge serving to communicate the pipe to the pump and said intake serving to communicate the pipe to the liquid, a cylindrical screen for straining the debris from the liquid, means for supporting and journaling said screen on and for coaxial rotation about said pipe in a manner that disposes said screen in outwardly spaced relation to said pipe and in surrounding relation to said intake for causing liquid entering the intake to have been strained by said screen, nozzle structure interior of said screen and directed toward said screen for emitting fluid through a limited area of said screen, in which said intake comprises openings through the sidewall of said main pipe, said openings being spaced apart axially along said main pipe and said openings being progressively larger in size the further they are along the length of said main pipe from said discharge.

14. A self-cleaning strainer as set forth in claim 13 in which said openings comprise a pattern of circular holes arranged in axial rows that are circumferentially spaced around said main pipe.

15. A self-cleaning strainer for connection to a pump and immersion in debris-containing liquid to prevent debris in the liquid from being sucked along with liquid into the pump, said strainer comprising a main cylindrical pipe having an intake and a discharge at spaced locations along its length said discharge serving to communicate the pipe to the pump and said intake serving to communicate the pipe to the liquid, a cylindrical screen for straining the debris from the liquid, means for supporting and journaling said screen on and for coaxial rotation about said pipe in a manner that disposes said screen in outwardly spaced relation to said pipe and in surrounding relation to said intake for causing liquid entering the intake to have been strained by said screen, nozzle structure interior of said screen and directed toward said screen for emitting fluid through a limited area of said screen, in which said means for supporting and journaling said screen on and for coaxial rotation about said main pipe comprises a spool-like structure having end wall structures which close the axial ends of said screen to said main pipe and a series of circular wheels supported on one of said end wall structures in outwardly spaced relation to said main pipe and arranged so that each wheel has essentially a tangential circumferential contact between its perimeter and the outside wall of said main pipe.

16. A self-cleaning strainer as set forth in claim 15 in which said wheels are substantially identical in diameter and arranged for rotation about individual axes parallel to the axis of said main pipe and lying on a common circle coaxial with said main pipe, said wheels being UHMW plastic, and said main pipe being PVC.

17. A self-cleaning strainer as set forth in claim 16 including an annular lip type PTFE seal supported on said one end wall structure to provide a full circumferentially continuous sealing lip contact with the outside wall of said main pipe for sealing between said main pipe and said one end wall structure, said wheels being disposed interiorly of the screen relative to the location at which said seal has sealing contact with said main pipe.

18. A self-cleaning strainer for connection to a pump and immersion in debris-containing liquid to prevent debris in the liquid from being sucked along with liquid into the pump, said strainer comprising a main cylindrical pipe having an intake and a discharge at spaced locations along its length said discharge serving to communicate the pipe to the pump and said intake serving to communicate the pipe to the liquid, a cylindrical screen for straining the debris from the liquid, means for supporting and journaling said screen on and for coaxial rotation about said pipe in a manner that disposes said screen in outwardly spaced relation to said pipe and in surrounding relation to said intake for causing liquid entering the intake to have been strained by said screen, nozzle structure interior of said screen and directed toward said screen for emitting fluid through a limited area of said screen, in which said means for supporting and journaling said screen on and for coaxial rotation about said main pipe comprises a spool-like structure having end wall structures which close the axial ends of said screen to said main pipe and bearing means supported on one of said end wall structures in outwardly spaced relation to said main pipe to provide a journal for said spool-like structure at said one end wall, and an annular lip type seal supported on said one end wall structure to provide a full circumferentially continuous sealing lip contact with the outside wall of said main pipe for sealing between said main pipe and said one end wall structure, in which the outer margin of said seal is held by ring retention structure on said one end wall structure, and the inner margin curls outwardly to form said sealing lip, said bearing means on said one end wall structure being interior of said screen relative to the location at which said sealing lip contact said main pipe.

19. A self-cleaning strainer for connection to a pump and immersion in debris-containing liquid to prevent debris in the liquid from being sucked along with liquid into the pump, said strainer comprising a main cylindrical pipe having an intake and a discharge at spaced locations along its length said discharge serving to communicate the pipe to the pump and said intake serving to communicate the pipe to the liquid, a cylindrical screen for straining the debris from the liquid, means for supporting and journaling said screen on and for coaxial rotation about said pipe in a manner that disposes said screen in outwardly spaced relation to said pipe and in surrounding relation to said intake for causing liquid entering the intake to have been strained by said screen, a supply pipe extending axially through said main pipe, nozzle structure tapped into said supply pipe and directed toward said screen for emitting through said screen fluid that has been fed through said supply pipe, in which said means for supporting and journaling said screen on and for coaxial rotation about said main pipe comprises a circular cylindrical bushing fitted onto said supply pipe, said supply pipe being arranged coaxial with said main pipe and passing through an end wall structure that closes one end of said screen, and a series of annular discs supported on said end wall structure and containing circular holes with respect to which the outside of said bushing has a close rotatable fit.

20. A self-cleaning strainer as set forth in claim 19 in which said bushing and said series of annular discs are UHMW plastic.

* * * * *